US012707516B2

(12) United States Patent
Kishida et al.

(10) Patent No.: US 12,707,516 B2
(45) Date of Patent: Aug. 11, 2026

(54) TRANSMITTING STATION AND RECEIVING STATION

(71) Applicant: NTT, Inc., Tokyo (JP)

(72) Inventors: Akira Kishida, Musashino (JP); Yasuhiko Inoue, Musashino (JP); Kengo Nagata, Musashino (JP); Yusuke Asai, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 371 days.

(21) Appl. No.: 17/911,608

(22) PCT Filed: Mar. 17, 2020

(86) PCT No.: PCT/JP2020/011815

§ 371 (c)(1),
(2) Date: Sep. 14, 2022

(87) PCT Pub. No.: WO2021/186587

PCT Pub. Date: Sep. 23, 2021

(65) Prior Publication Data

US 2023/0119202 A1 Apr. 20, 2023

(51) Int. Cl.

*H04W 76/15* (2018.01)
*H04L 1/08* (2006.01)
*H04L 1/1607* (2023.01)

(52) U.S. Cl.

CPC ............... *H04W 76/15* (2018.02); *H04L 1/08* (2013.01); *H04L 1/1607* (2013.01)

(58) Field of Classification Search

None
See application file for complete search history.

(56) References Cited

U.S. PATENT DOCUMENTS

2019/0150214 A1* 5/2019 Zhou ..................... H04W 76/15 370/329
2021/0126947 A1* 4/2021 Wang .................... H04L 63/162
(Continued)

FOREIGN PATENT DOCUMENTS

JP 200760494 A 3/2007
WO WO-2004/102889 A1 11/2004

OTHER PUBLICATIONS

IEEE Std 802.11-2016, "Part 11: Wireless LAN Medium Access Control (MAC) and Physical Layer (PHY) Specifications", Dec. 7, 2016, Section 4.10.3 and 11.3.
(Continued)

*Primary Examiner* — The Hy Nguyen
(74) *Attorney, Agent, or Firm* — Harness, Dickey & Pierce, P.L.C.

(57) ABSTRACT

A transmitting station according to an embodiment includes a first wireless signal processing unit 140, a second wireless signal processing unit 150, and a link management unit 120. The first wireless signal processing unit is configured to transmit wireless signals including data, using a first channel. The second wireless signal processing unit is configured to transmit wireless signals including data, using a second channel that is different from the first channel. The link management unit manages a link state of the first wireless signal processing unit and a link state of the second wireless signal processing unit. In a case in which a multilink is established with a receiving station and wireless signals are to be transmitted using the multilink, the link management unit imparts multilink information indicating using the multilink, and identification information indicating the order of the data, to the data, and outputs the data, to which the multilink information and the identification information are imparted, to one of the first wireless signal processing unit
(Continued)

and the second wireless signal processing unit, in the order of input.

4 Claims, 11 Drawing Sheets

(56) References Cited

U.S. PATENT DOCUMENTS

| | | | | |
|---|---|---|---|---|
| 2021/0211386 | A1* | 7/2021 | Qu | H04L 47/32 |
| 2021/0211937 | A1* | 7/2021 | Qu | H04L 1/1642 |
| 2022/0086098 | A1* | 3/2022 | Huang | H04L 1/00 |
| 2022/0418027 | A1* | 12/2022 | Takada | H04W 80/02 |

OTHER PUBLICATIONS

International Search Report (English and Japanese) and Written Opinion (Japanese) of the ISA issued in PCT/JP2020/011815, mailed Sep. 1, 2020; ISA/JP.

* cited by examiner

Fig. 9

| MULTILINK FLAG | IDENTIFICATION NUMBER NOT RECEIVED YET |
| --- | --- |

TRANSMITTING STATION AND RECEIVING STATION

CROSS-REFERENCE TO RELATED APPLICATIONS

This application is a 371 U.S. National Phase of International Application No. PCT/JP2020/011815 filed on Mar. 17, 2020. The entire disclosures of the above applications are incorporated herein by reference.

TECHNICAL FIELD

An embodiment relates to a transmitting station and a receiving station.

BACKGROUND ART

There is known a wireless LAN (Local Area Network) as a wireless system between a transmitting station that transmits wireless signals and a receiving station that receives wireless signals, such as a access point and a terminal.

CITATION LIST

Non Patent Literature

NPL 1: IEEE Std 802.11-2016, "Figure 4-25 Establishing the IEEE 802.11 association" and "11.3 STA authentication and association", 7 Dec. 2016

SUMMARY OF THE INVENTION

Technical Problem

An embodiment provides a transmitting station and a receiving station with improved speed and stability in wireless communication.

Means for Solving the Problem

In the embodiment, a transmitting station transmits wireless signals. The transmitting station includes a first wireless signal processing unit, a second wireless signal processing unit, and a link management unit. The first wireless signal processing unit is configured to transmit wireless signals including data, using a first channel. The second wireless signal processing unit is configured to transmit wireless signals including data, using a second channel that is different from the first channel. The link management unit manages a link state of the first wireless signal processing unit and a link state of the second wireless signal processing unit. In a case in which a multilink is established with a receiving station and wireless signals are to be transmitted using the multilink, the link management unit imparts multilink information indicating using the multilink, and identification information indicating the order of the data, to the data, and outputs the data, to which the multilink information and the identification information are imparted, to one of the first wireless signal processing unit and the second wireless signal processing unit, in the order of input.

Advantageous Effects of the Invention

According to the embodiment, a transmitting station and a receiving station with improved speed and stability in wireless communication can be provided.

BRIEF DESCRIPTION OF DRAWINGS

FIG. 9 is a diagram illustrating an example of a frame format of a retransmission frame.

DESCRIPTION OF EMBODIMENTS

Figure 1:
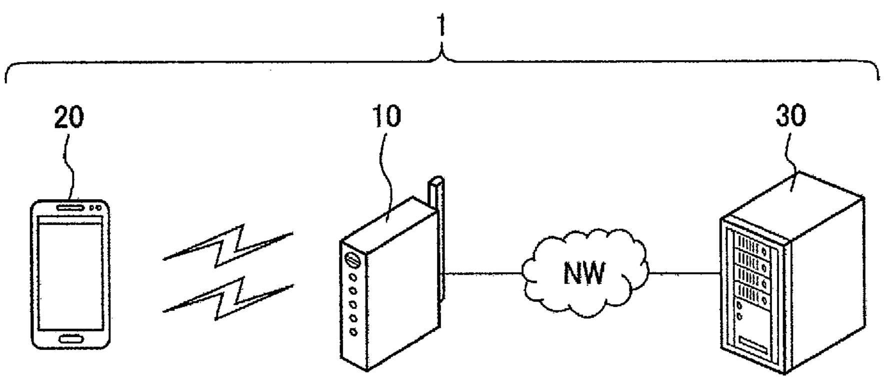
FIG. 1 is a diagram illustrating an example of a configuration of a wireless system according to an embodiment.

An embodiment will be described below with reference to the drawings. FIG. 1 illustrates an example of a configuration of a wireless system 1 according to the embodiment. As illustrated in FIG. 1, the wireless system 1 is provided with, for example, a access point 10, a terminal 20, and a server 30.

The access point 10 is connected to a network NW, and is used as an access point for a wireless LAN. For example, the access point 10 can wirelessly transmit data received from the network NW to the terminal 20. The access point 10 can also be connected to the terminal 20 using one channel, or a plurality of different channels. In the present specification, wireless connection between the access point 10 and the terminal 20 using a plurality of different channels will be referred to as "multilink". The communication between the access point 10 and the terminal 20 is based on the IEEE 802.11 standard, for example.

The terminal 20 is a wireless terminal such as a smartphone, a tablet PC, or the like. The terminal 20 can exchange data with the server 30 on the network NW via the access point 10 to which it is wirelessly connected. The terminal 20 may be other electronic equipment, such as a desktop computer, a laptop computer, or the like. It is sufficient for the terminal 20 to be communicable with the access point 10, at the least.

The server 30 is capable of holding various types of information, and holds data of contents of which the terminal 20 is the object, for example. The server 30 is connected to the network NW by a wired connection, for example, and is configured to be communicable with the access point 10 via the network NW. It is sufficient for the server 30 to be capable of communication with at least the access point 10. That is to say, the communication between the access point 10 and the server 30 may be wired or wireless.

Figure 2:
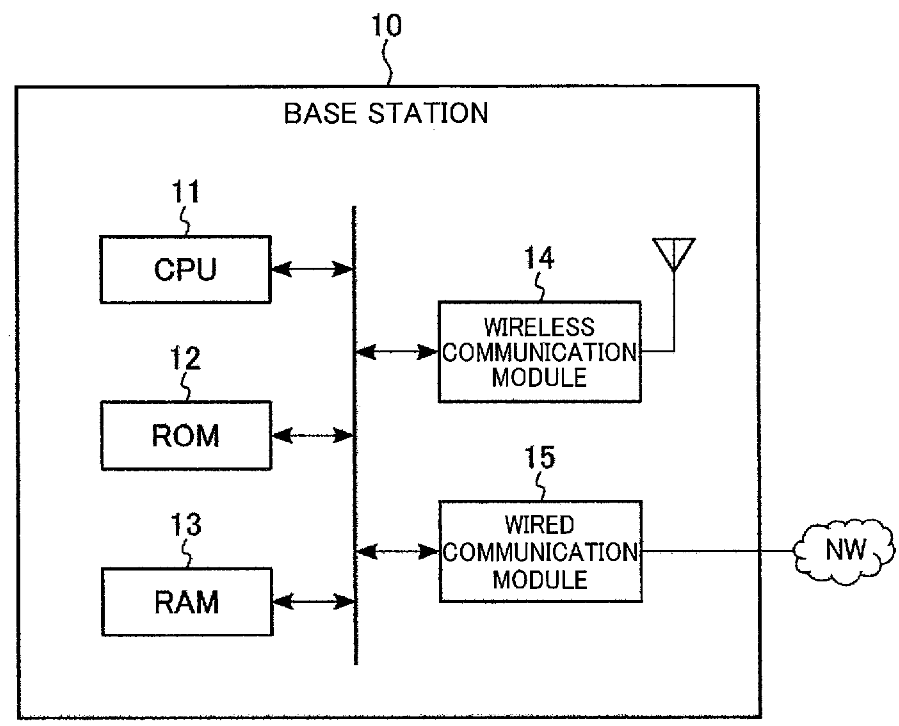
FIG. 2 is a diagram illustrating an example of a configuration of a access point.

FIG. 2 illustrates an example of a configuration of the base station 10. The access point 10 is provided with a CPU (Central Processing Unit) 11, ROM (Read Only Memory) 12, RAM (Random Access Memory) 13, a wireless communication module 14, and a wired communication module 15, for example, as illustrated in FIG. 2.

The CPU 11 is a circuit that is capable of executing various programs, and controls operations of the entire access point 10. An ASIC or the like may be used instead of the CPU. Also, the CPU 11 is not limited to one, and may be two or more. The ROM 12 is nonvolatile semiconductor memory, and holds programs, control data, and so forth, for controlling the access point 10. The RAM 13 is volatile semiconductor memory, for example, and is used as a work area of the CPU 11. The wireless communication module 14 is a circuit used for exchange of data by wireless signals, and is connected to an antenna. The wireless communication module 14 also includes a plurality of communication modules corresponding to each of a plurality of frequency bands, for example. The wired communication module 15 is a circuit used for exchange of data by wired signals, and is connected to the network NW.

Figure 3:
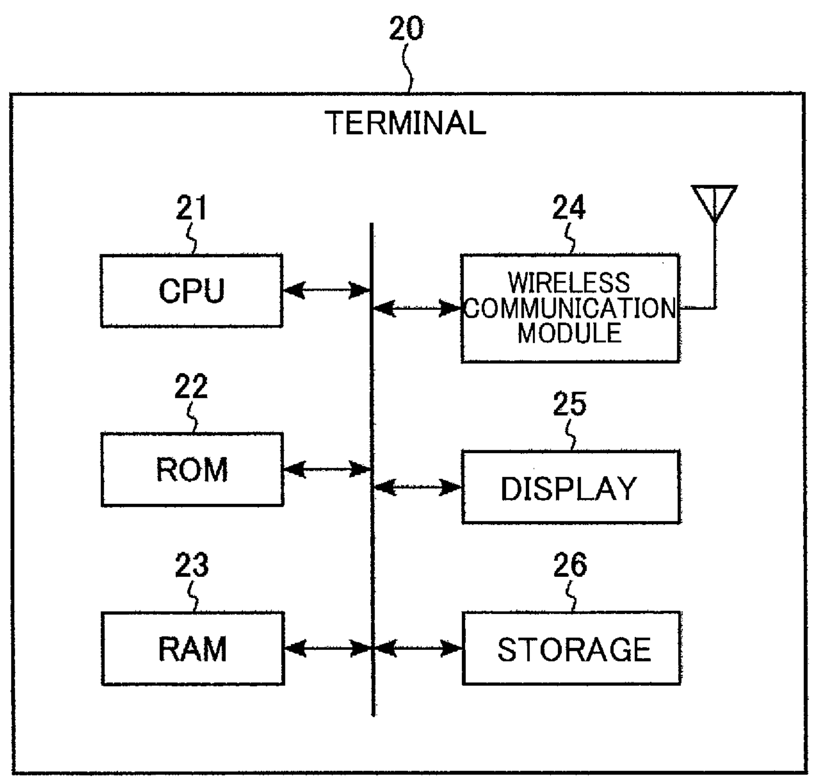
FIG. 3 is a diagram illustrating an example of a configuration of a terminal.

FIG. 3 illustrates an example of a configuration of the terminal 20. The terminal 20 is provided with a CPU 21, ROM 22, RAM 23, a wireless communication module 24, a display 25, and storage 26, for example, as illustrated in FIG. 3.

The CPU 21 is a circuit that is capable of executing various programs, and controls operations of the entire terminal 20. An ASIC or the like may be used instead of the CPU. Also, the CPU 21 is not limited to one, and may be two or more. The ROM 22 is nonvolatile semiconductor memory, and holds programs, control data, and so forth, for controlling the terminal 20. The RAM 23 is volatile semiconductor memory, for example, and is used as a work area of the CPU 21. The wireless communication module 24 is a circuit used for exchange of data by wireless signals, and is connected to an antenna. The wireless communication module 24 also includes a plurality of communication modules corresponding to each of a plurality of frequency bands, for example. The display 25 displays a GUI (Graphical User Interface) corresponding to application software, and so forth. The display 25 may have functions of an input interface of the terminal 20. The storage 26 is a nonvolatile storage device, and holds system software of the terminal 20 and so forth.

The wireless system 1 executes data communication on the basis of the OSI (Open Systems. Interconnection) reference model, for example. Communication functions in the OSI reference model are divided into seven layers (Layer 1: physical layer, Layer 2: data link layer, Layer 3: network layer, Layer 4: transport layer, Layer 5: session layer, Layer 6: presentation layer, Layer 7: application layer). The data link layer includes, for example, an LLC (Logical Link Control) layer and a MAC (Media Access Control) layer. In the present specification, Layer 3 through Layer 7 will be referred to as "higher layers", with the data link layer as a reference.

Figure 4:
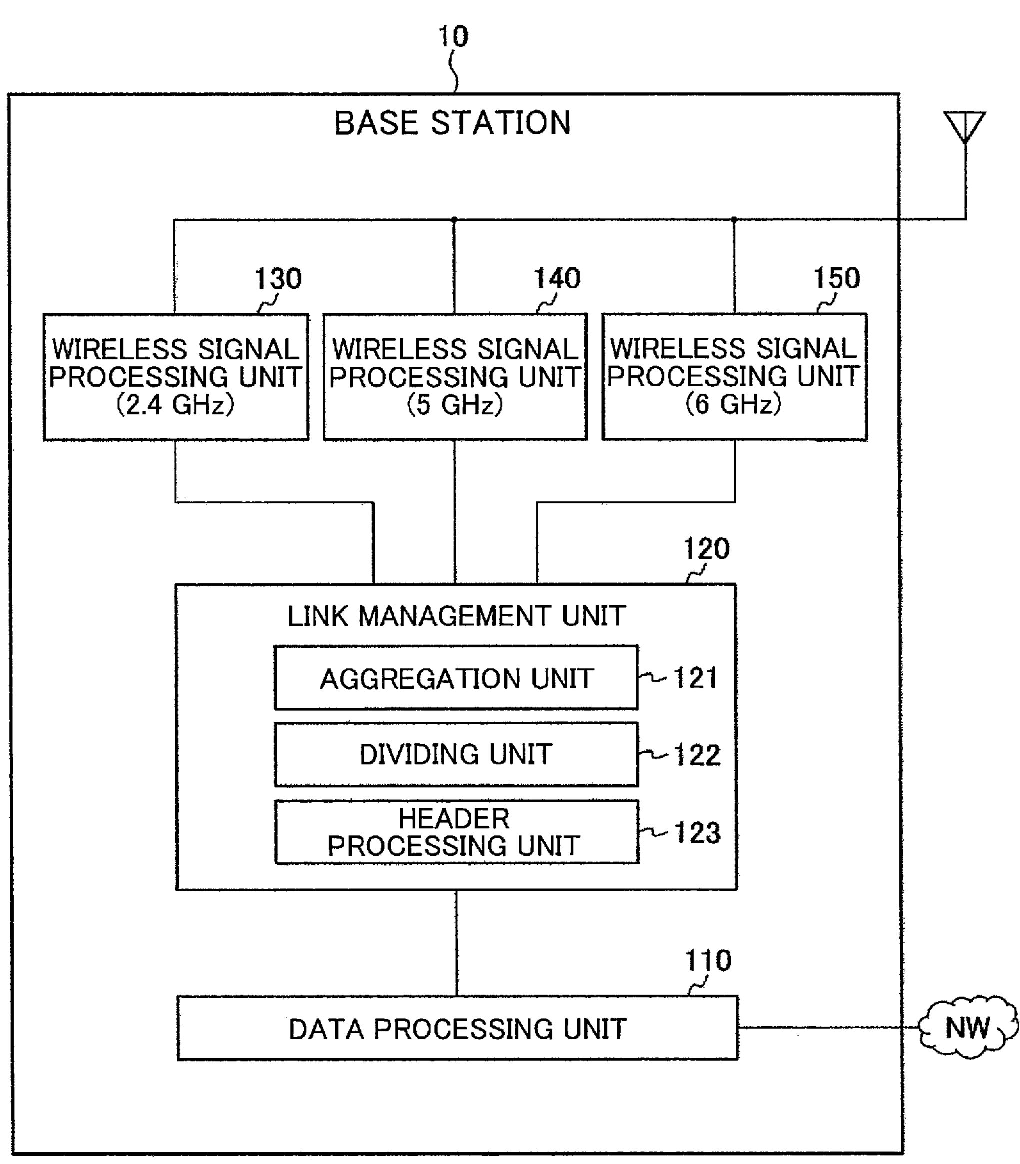
FIG. 4 is a diagram illustrating an example of a functional configuration of the access point.

FIG. 4 illustrates an example of a functional configuration of the access point 10. The access point 10 includes, for example, a data processing unit 110, a link management unit 120, and wireless signal processing units 130, 140, and 150, as illustrated in FIG. 4. FIG. 4 illustrates an example of when the access point 10 is a transmitting-side station of wireless signals.

The data processing unit 110 is capable of executing processing at the LLC layer and processing of higher layers, with regard to input data. For example, the data processing unit 110 outputs data input from the server 30 via the network NW to the link management unit 120.

The link management unit 120 manages links with the terminal 20. The link management unit 120 also performs processing of the MAC layer with regard to data input from the data processing unit 110. The link management unit 120 has an aggregation unit 121, a dividing unit 122, and a header processing unit 123. The aggregation unit 121 links data (LLC packets) input from the data processing unit 110 to generate an A-MPDU (Aggregate-MAC protocol data unit), for example. The processing up to generating the A-MPDU from data may be based on the IEEE 802.11 standard, for example. That is to say, processing may be performed in the order of 1) A-MSDU (Aggregate-MAC service data unit) aggregation, 2) sequence number assignation, 3) fragmentation, 4) MPDU encryption, 5) MPDU header and error-detecting code impartation, and 6) A-MPDU aggregation. The dividing unit 122 divides the A-MSDU generated by the aggregation unit 121 in accordance with the number of links established with the terminal 20. The header processing unit 123 imparts headers to each piece of the divided data to generate wireless frames. Now, the header in the embodiment includes a multilink flag and an identification number. The multilink flag is 1-bit information, for example, indicating whether or not to perform data transmission by multilink. The identification number is information indicating the order of the divided data. In a case of an A-MSDU being divided into two, for example, an identification number "1" is imparted to the divided data on the leading (high-order bit) side in the A-MSDU, and an identification number "2" is imparted to the divided data on the following (low-order bit) side. The identification number may further include information indicating the total count of divided data. Note that a configuration may be made in which the link management unit 120 reconstructs data input from the data processing unit 110, and the wireless signal processing units 130, 140, and 150 perform MAC layer processing. In this case, the aggregation unit 121 links data (LLC packets) input from the data processing unit 110. The dividing unit 122 divides the data linked by the aggregation unit 121 in accordance with the number of links established with the terminal 20. The header processing unit 123 imparts heads to each piece of the divided data. Processing up to generating an A-MPDU from data that is linked, divided, and headers imparted, may be performed by the wireless signal processing unit to which data is input, out of the wireless signal processing units 130, 140, and 150, on the basis of the IEEE 802.11 standard, for example. That is to say, processing may be performed in the order of 1) A-MSDU (Aggregate-MAC service data unit) aggregation, 2) sequence number assignation, 3) fragmentation, 4) MPDU encryption, 5) MPDU header and error-detecting code impartation, and 6) A-MPDU aggregation. Hereinafter, description will be made regarding a configuration in which the link management unit 120 generates A-MPDUs, but supplementary description will be made as appropriate regarding portions with differences in arrangements in a case of the wireless signal processing units performing the MAC layer processing.

The wireless signal processing units 130, 140, and 150 each execute Layer 1 processing, for example, with regard to input data (may perform MAC layer processing). The wireless signal processing unit 130 handles wireless signals of the 2.4 GHz band. The wireless signal processing unit 140 handles wireless signals of the 5 GHz band. The wireless signal processing unit 150 handles wireless signals of the 6

GHz band. The wireless signal processing units 130, 140, and 150 may share the antenna of the access point 10, but do not have to share the antenna. For example, the wireless signal processing units 130, 140, and 150 may each convert wireless frames into wireless signals, and transmit the wireless signals via the antenna of the access point 10.

Figure 5:
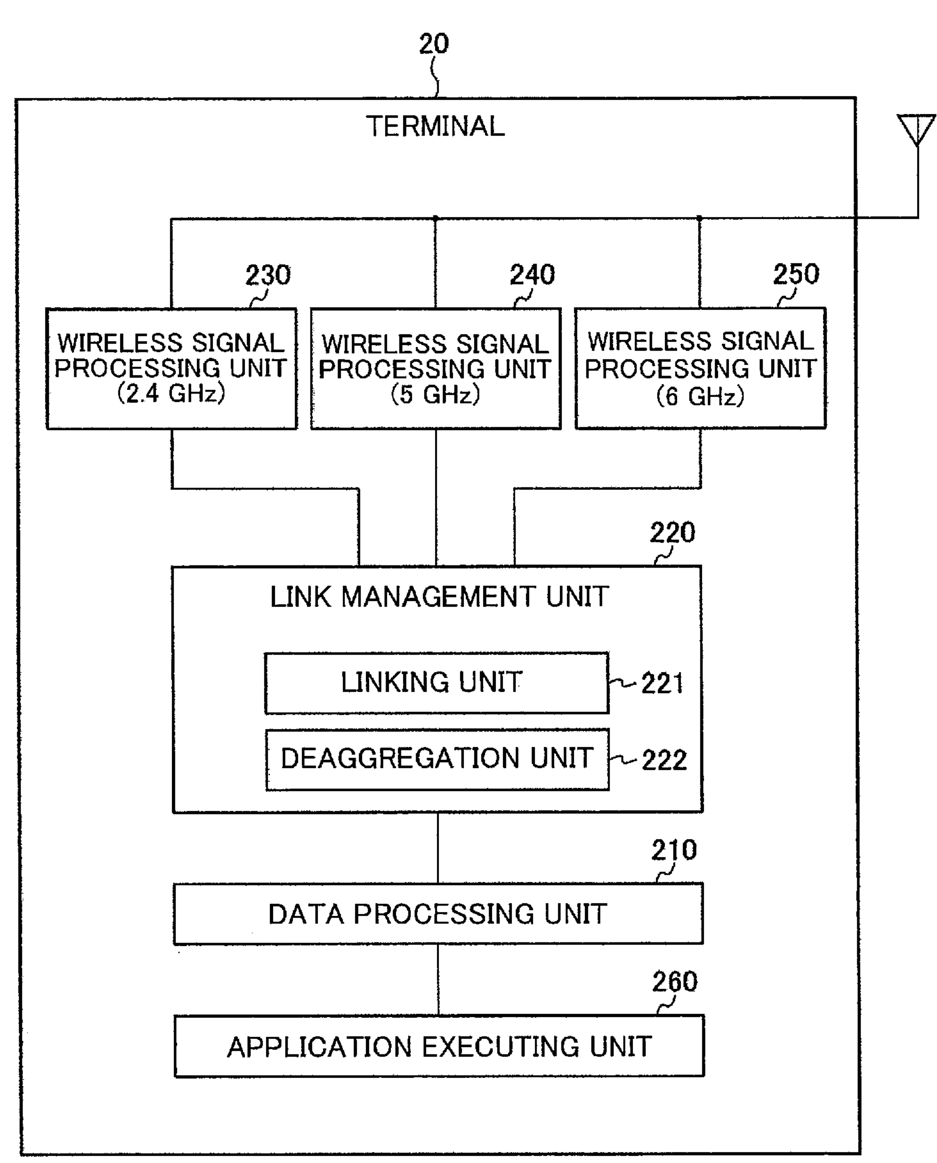
FIG. 5 is a diagram illustrating an example of a functional configuration of the terminal.

FIG. 5 illustrates an example of a functional configuration of the terminal 20. The terminal 20 includes, for example, a data processing unit 210, a link management unit 220, wireless signal processing units 230, 240, and 250, and an application executing unit 260, as illustrated in FIG. 5. FIG. 5 illustrates an example of when the terminal 20 is a receiving-side station of wireless signals.

The data processing unit 210 is capable of executing processing at the LLC layer and processing of higher layers, with regard to input data. For example, the data processing unit 210 outputs data input from the link management unit 220 to the application executing unit 260.

The link management unit 220 manages links with the access point 10. The link management unit 220 also is capable of executing MAC layer processing, for example, with regard to input data. The link management unit 220 has a linking unit 221 and a deaggregation unit 222. The linking unit 221 links divided data input from the wireless signal processing units 230, 240, and 250 and recreates the A-MPDU, for example. The deaggregation unit 222 recreates data (LLC packets) from the A-MPDU. The processing up to recreating data from the A-MPDU may be based on the IEEE 802.11 standard, for example. That is to say, processing may be performed in the order of 1) A-MPDU deaggregation, 2) error detection, 3) address detection, 4) MPDU decryption, 5) defragmentation, and 6) A-MSDU deaggregation. Note that in a case in which the wireless signal processing units 230, 240, and 250 perform MAC layer processing, the linking unit 221 links the divided data input from the wireless signal processing units. The deaggregation unit 222 extracts the data (LLC packets) from the linked data.

The wireless signal processing units 230, 240, and 250 each perform Layer 1 processing for example, with regard to input wireless signals (may perform MAC layer processing). The wireless signal processing unit 230 handles wireless signals of the 2.4 GHz band. The wireless signal processing unit 240 handles wireless signals of the 5 GHz band. The wireless signal processing unit 250 handles wireless signals of the 6 GHz band. The wireless signal processing units 230, 240, and 250 may share the antenna of the terminal 20, but do not have to share the antenna. For example, the wireless signal processing units 230, 240, and 250 may each convert wireless signals received via the antenna of the terminal 20 into wireless frames, and output the data in increments of MPDUs included in the wireless frames to the link management unit 220.

The application executing unit 260 executes an application that enables usage of data input from the data processing unit 210. For example, the application executing unit 260 can display information of the application on the display 25. Also, the application executing unit 260 can operate on the basis of operations performed on an input interface.

In the functional configuration of the wireless system 1 described above, the wireless signal processing units 130, 140, and 150 of the access point 10 are configured to be capable of connecting with the wireless signal processing units 230, 240, and 250 of the terminal 20, respectively. Specifically, the wireless signal processing units 130 and 230 can be wirelessly connected using the 2.4 GHz band. The wireless signal processing units 140 and 240 can be wirelessly connected using the 5 GHz band. The wireless signal processing units 150 and 250 can be wirelessly connected using the 6 GHz band. Each of the wireless signal processing units may be referred to as "STA function". That is to say, the wireless system 1 has a plurality of STA functions.

Figure 6:
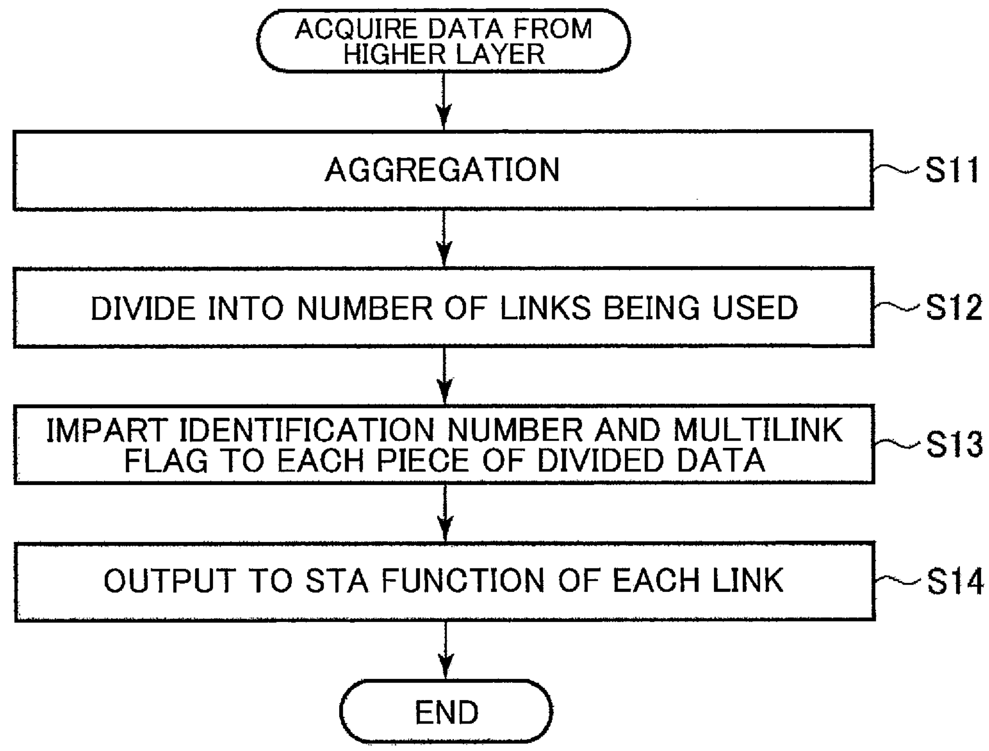
FIG. 6 is a flowchart showing an example of processing of a link management unit, out of transmission processing of wireless signals in the wireless system.

Next, an example of the flow of multilink processing in the wireless system 1 will be described. FIG. 6 is a flowchart showing an example of processing of the link management unit, out of the transmission processing of wireless signals in the wireless system 1. Hereinafter, the access point 10 is a transmitting station that transmits wireless signals. The processing in FIG. 6 is started when data from the server 30 that is at a higher layer, for example, is input to the link management unit 120 via the data processing unit 110. Also, in the following description, multilink is established between the access point 10 and the terminal 20. The technique for establishing multilink between the access point 10 and the terminal 20 is not limited in particular. For example, multilink may be established in a form in which the terminal 20 responds to a request for multilink from the access point 10, or multilink may be established in a form in which the base access point 10 responds to a request for multilink from the terminal 20.

Figure 7:
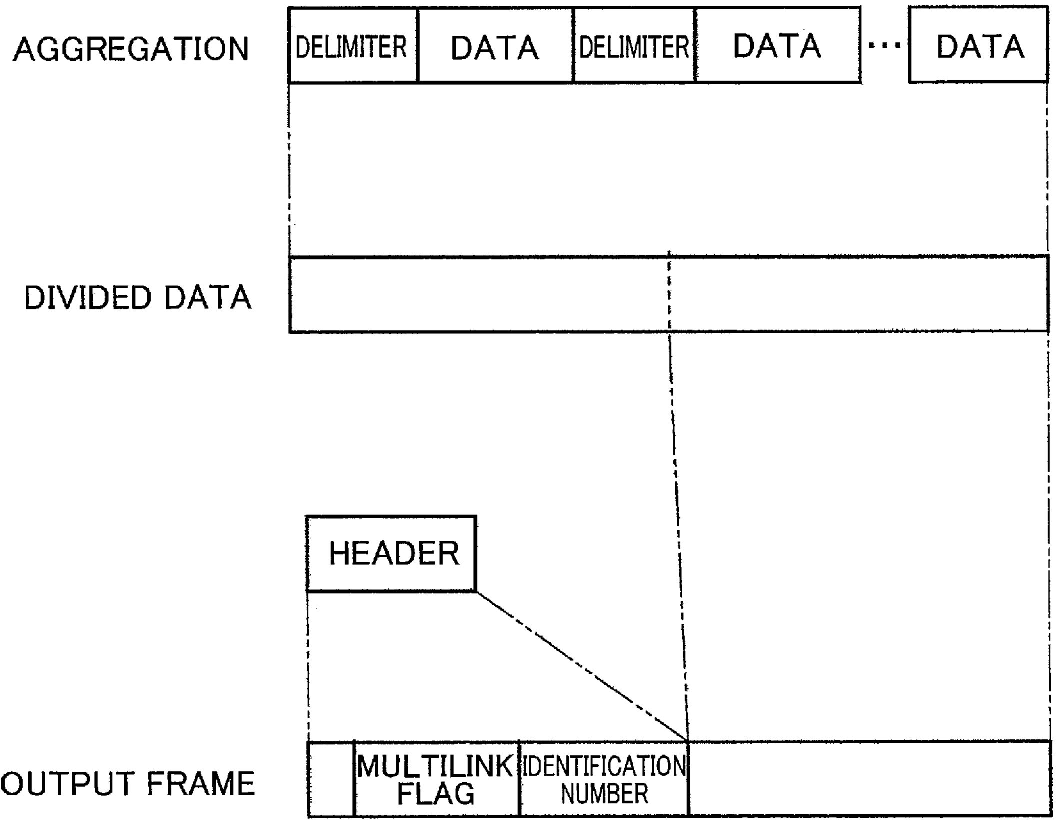
FIG. 7 is a conceptual diagram of data processing in a link management unit 120.

In step S11, the link management unit 120 aggregates a plurality of pieces of data from the higher layer. FIG. 7 is a conceptual diagram of data processing at the link management unit 120. As illustrated in FIG. 7, the data generated by aggregation in the embodiment is linked in a state in which separations are imparted by delimiters. A delimiter includes, for example, information of the length of the following data, error-detecting code for detecting errors in the following data, and a predetermined bit string for identifying boundaries between data. The error-detecting code may be CRC (cyclic redundancy check) code. Also, the delimiter may include a reservation bit. Also, the delimiter may simply be a predetermined bit string for identifying a boundary between data. The respective data may be data in MPDU increments, for example. Also, the data may be configured as data in increments of MPDUs by padding being added.

In step S12, the link management unit 120 divides the data generated by aggregation by the number of links. For example, when two links are established by the wireless signal processing unit 130 and the wireless signal processing unit 140, the link management unit 120 divides the data into two, as illustrated in FIG. 7. Also, when three links are established by the wireless signal processing unit 130, the wireless signal processing unit 140, and the wireless signal processing unit 150, the link management unit 120 divides the data into three. The boundaries at the time of dividing may be identified by delimiters. Division of data does not necessarily have to be divided into equal parts.

In step S13, the link management unit 120 generates wireless frames, with headers imparted to each piece of divided data. As illustrated in FIG. 7, the header includes a multilink flag and an identification number. The multilink flag has a value of "0" when multilink is not used, and a value of "1" when used, for example. In the case in step S13, the link management unit 120 imparts "1" as the multilink flag for the divided data. Also, the identification number is given in order to the divided data. The multilink flag and the identification number may be imparted as an extended MAC header using a reservation bit. Also, information in the header other than the multilink flag and the identification number may be imparted as appropriate on the basis of the IEEE 802.11 standard, for example. Note that in a case in which the wireless signal processing units 130, 140, and 150 perform MAC layer processing, header information based on the IEEE 802.11 standard may be imparted at the one of the wireless signal processing units 130, 140, and 150 to which data is input.

In step S14, the link management unit 120 sequentially outputs wireless frames based on the divided data to the STA functions at which multilink is established. For example, when two links are established by the wireless signal processing unit 130 and the wireless signal processing unit 140, the link management unit 120 outputs one wireless frame based on the divided data to the wireless signal processing unit 130, and outputs the other wireless frame to the wireless signal processing unit 140. Thereafter, the link management unit 120 ends the processing of FIG. 6. Subsequently, the respective wireless signal processing units convert the wireless frames into wireless signals, and perform transmission thereof to the terminal 20.

Figure 8:
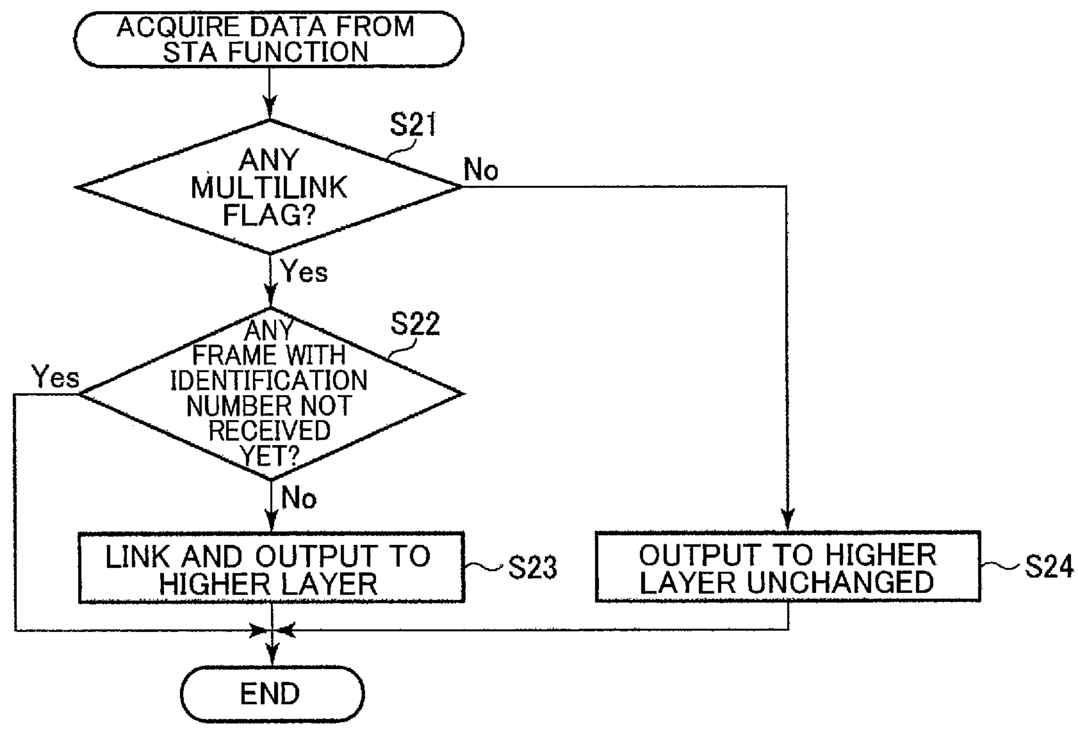
FIG. 8 is a flowchart showing an example of processing of the link management unit, out of reception processing of wireless signals in the wireless system.

FIG. 8 is a flowchart showing an example of processing of the link management unit, out of the reception processing of wireless signals in the wireless system 1. Now, the terminal 20 is a receiving station that receives wireless signals hereinafter. The processing in FIG. 8 is started when data from a wireless signal processing unit is input to the link management unit 220.

In step S21, the link management unit 220 references the header of the wireless frame, and determines whether or not there is a multilink flag. For example, determination is made that there is a multilink flag when "1" is imparted to the multilink flag. When determining that there is a multilink flag in step S21, the processing transitions to step S22. When determination is made in step S21 that there is no multilink flag, the processing transitions to step S24.

In step S22, the link management unit 220 references the header of the wireless frame, and determines whether or not there is a wireless frame with an identification number that has not been received yet. The identification numbers are given in order, as described above, and accordingly when there is a missing number in the received wireless frames, determination is made that there is a wireless frame of an identification number that has not been received yet. Separately, in a case identification numbers include information of the total number, and the number of wireless frames received is less than the total number, determination may be made that there is a wireless frame of an identification number that has not been received yet. When determination is made in step S22 that that there is a wireless frame of an identification number that has not been received yet, the link management unit 220 temporarily ends the processing of FIG. 8 and the processing stands by. When determination is made in step S22 that there is no wireless frame of an identification number that has not been received yet, the processing transitions to step S23.

In step S23, the link management unit 220 links the divided data in the order of the identification number, and thereafter performs deaggregation processing, thereby recreating the original data. The link management unit 220 then outputs the recreated data to a higher layer, such as the application executing unit 260. The link management unit 220 then ends the processing of FIG. 8.

In step S24, the link management unit 220 outputs the data to a higher layer, such as the application executing unit 260. The link management unit 220 then ends the processing of FIG. 8. Note that when the received data is aggregated, the link management unit 220 recreates the original data by performing deaggregation processing, and thereafter outputs the data to the higher layer.

As described above, according to the embodiment, transmission is performed by the transmitting station with data being allocated to each of the plurality of STA functions, by multilink processing. Accordingly, the plurality of STA functions are effectively used, and the transmission speed of data also improves.

Also, by the multilink flag and the identification number being imparted to the data, the confirmation can be made at the receiving station that transmission of the data has been performed using multilink, and also, divided data that can be received simultaneously via the plurality of STA functions is correctly linked.

[Modification 1]

Modifications of the embodiment will be described below. In the above-described embodiment, the access point 10 transmits wireless signals, and the terminal 20 transmits wireless signals. Conversely, in an arrangement in which the access point 10 has the link management unit 220 and the terminal 20 has the link management unit 120, the technology of the embodiment can also be applied to a situation in which the terminal 20 transmits wireless signals and the access point 10 receives wireless signals. That is to say, the relation between transmitting station and receiving station described in the embodiment can be interchanged. As a matter of course, each of the access point 10 and the terminal 20 may have both the link management unit 120 and the link management unit 220.

[Modification 2]

In the embodiment, the STA functions are configured to transmit and receive wireless signals using channels with frequency bands different from each other. Conversely, the STA functions may be configured to transmit and receive wireless signals using different channels with the same frequency band as each other. For example, the wireless signal processing unit 130 may be configured to transmit wireless signals using a first channel of the 2.4 GHz band, and the wireless signal processing unit 140 may be configured to transmit wireless signals using a second channel of the 2.4 GHz band. The first channel and the second channel may each include a plurality of channels in this case, as long as not duplicative.

[Modification 3]

Figure 9:
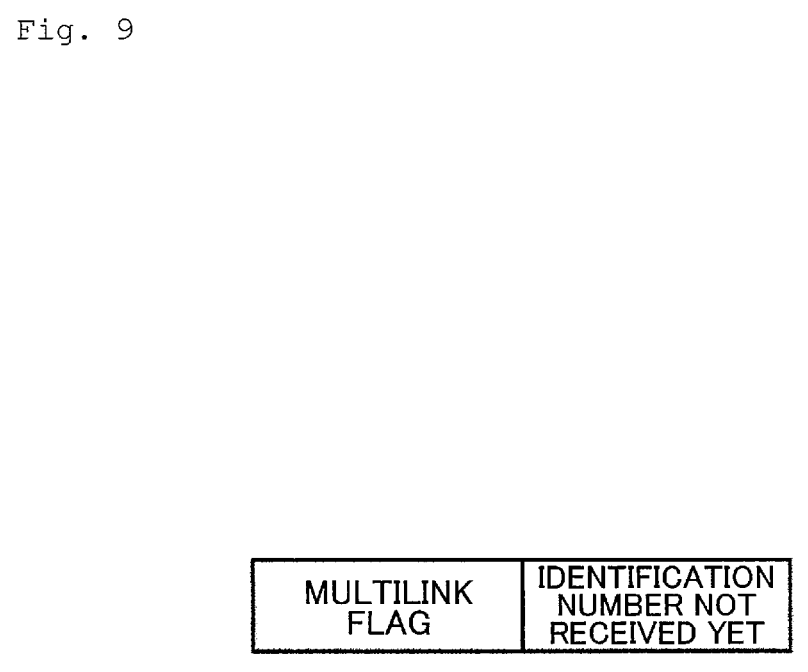

Processing when reception of divided data fails is omitted in the embodiment. Conversely, retransmission control may be further added to the processing described in the embodiment. In this case, when determination is made in step S22 that there is divided data that has not been received yet, or an error is detected in received data in the error detection during the deaggregation processing, for example, the link management unit of the receiving station transmits a retransmission frame that includes the identification number of the divided data that has not been received yet or regarding which an error has been detected, to the transmitting station. FIG. 9 is an example of a frame format of a retransmission frame. The retransmission frame in the example includes a multilink flag, and the identification number of the divided data that has not been received yet. The transmitting station that has received such a retransmission frame retransmits the divided data specified by the identification number. The same STA function as the STA function used for transmitting the divided data the previous time does not need to be used in retransmission. For example, a STA function that is determined to be in an available state from the results of carrier sensing may be given priority. Alternatively, a STA function that has greater reception power, for example, from the results of carrier sensing for each STA function may be used for retransmission.

Also, when there is a plurality of divided data that has not been received yet, retransmission may be requested by a block ACK instead of a retransmission frame. The block ACK in this case includes information of whether or not received, for each identification number. When the transmitting station receives the block ACK, the transmitting station retransmits the divided data of the identification numbers regarding which failure to receive is indicated therein. The block ACK may include, in addition to each identification number, information of whether or not each MPDU has been received.

[Modification 4]

Figure 10:
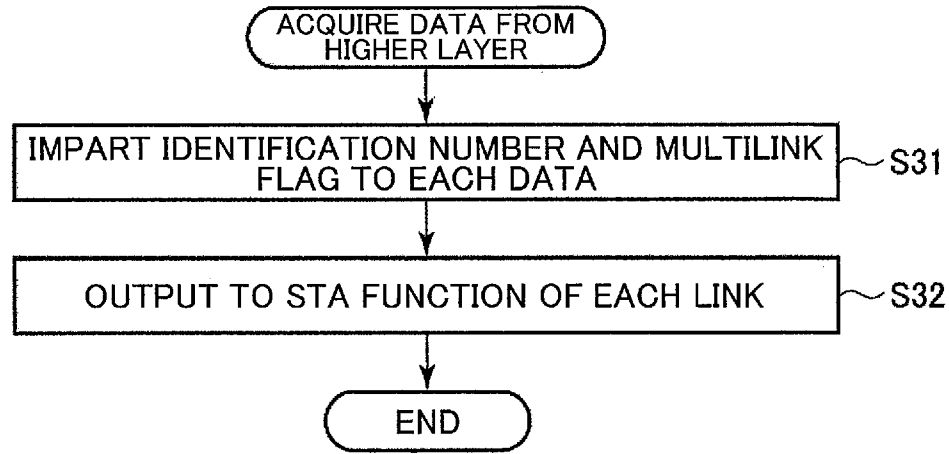
FIG. 10 is a flowchart showing an example of processing of a link management unit out of transmission processing of wireless signals in a wireless system according to Modification 4.

In the embodiment, aggregation of data is performed when transmitting, and the aggregated data is divided. This processing of aggregation and division may be omitted. FIG. 10 is a flowchart showing an example of processing by the link management unit in the wireless signal transmission processing in the wireless system 1 according to Modification 4.

In step S31, the link management unit 120 generates wireless frames by imparting a header to each piece of input data, instead of each piece of divided data. That header includes a multilink frag and an identification number. Information other than the multilink flag and the identification number may be imparted as appropriate on the basis of the IEEE 802.11 standard, for example.

In step S32, the link management unit 120 sequentially outputs wireless frames based on the data to STA functions at which multilink is established. For example, when two links are established by the wireless signal processing unit 130 and the wireless signal processing unit 140, the link management unit 120 alternatingly outputs the input data to the wireless signal processing unit 130 and the wireless signal processing unit 140. Alternatively, the link management unit 120 outputs the input data to the one of the wireless signal processing unit 130 and the wireless signal processing unit 140 that is available, on the basis of the results of carrier sensing. Thereafter, the link management unit 120 ends the processing of FIG. 10. Thereafter, the wireless signal processing units each convert the wireless frames into wireless signals, and perform transmission thereof to the terminal 20.

Now, the access point 10 that is the transmitting station may request a block ACK to the terminal 20 after transmitting all data input from the higher layer. When determination is made at the terminal 20 that there is data that has not been received yet due to this block ACK, the access point 10 may retransmit the data. When determination is made at the terminal 20 that there is no data that has not been received yet due to this block ACK, the access point 10 does not have to request a block ACK again.

Figure 11:
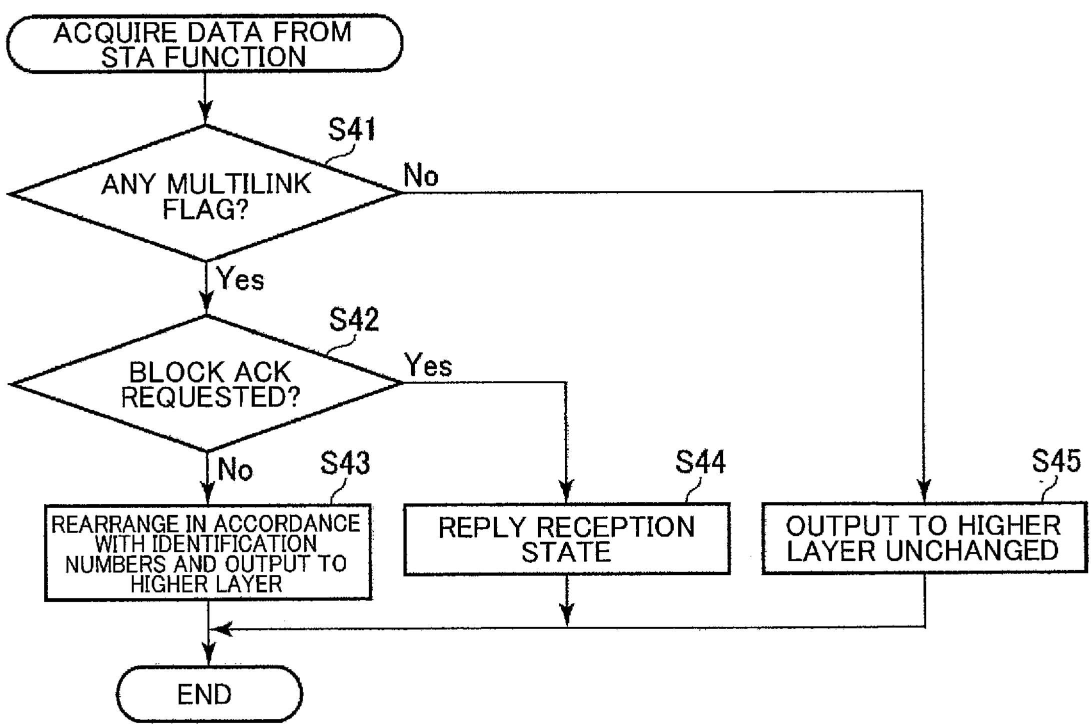
FIG. 11 is a flowchart showing an example of processing of the link management unit out of reception processing of wireless signals in the wireless system according to Modification 4.

FIG. 11 is a flowchart showing an example of processing by the link management unit, in the wireless signal reception processing in the wireless system 1 according to Modification 4.

In step S41, the link management unit 220 references the header of the wireless frame and determines whether or not there is a multilink flag. When determination is made in step S41 that there is a multilink flag, the processing transitions to step S42. When determination is made in step S41 that there is no multilink flag, the processing transitions to step S45.

In step S42, the link management unit 220 determines whether or not a request for a block ACK has been received. When determination is made in step S42 that no request for a block ACK has been received, the processing transitions to step S43. When determination is made in step S42 that a request for a block ACK has been received, the processing transitions to step S44.

In step S43, the link management unit 220 rearranges the data in order of the identification numbers, and outputs each piece of data to the higher layer such as the application executing unit 260 or the like. The link management unit 220 then ends the processing of FIG. 11.

In step S44, the link management unit 220 transmits a block ACK using STA functions. In this case, just one STA function may be used for transmission of the block ACK, or a plurality of STA functions may be used. Thereafter, the link management unit 220 ends the processing of FIG. 11.

In step S45, the link management unit 220 outputs the data to the higher layer such as the application executing unit 260 or the like. Thereafter, the link management unit 220 ends the processing of FIG. 11.

[Other Modifications]

Each of the processing in the embodiment described above can also be stored as a program that can be executed by a CPU or the like that is a computer. Additionally, storage thereof in a storage medium of an external storage device such as a magnetic disk, an optical disk, semiconductor memory, and so forth, may be performed, and distribution may be performed. The CPU or the like can then execute the above-described processing by reading in the program stored in the storage medium of the external storage device, and actions thereof being controlled by the program read in.

Note that the present invention is not limited to the above embodiment, and various modifications can be made at the stage of carrying out without departing from the essence thereof. Also, the embodiments may be combined and carried out as appropriate, and in this case, combined effects are obtained. Further, the above embodiment includes various types of inventions, and various inventions can be extracted by combination of selected sets of a plurality of disclosed components. For example, in a case in which the problem can be solved and effects can be obtained even though several components are omitted from all components shown in the embodiment, the configuration in which these components are omitted can be extracted as an invention.

REFERENCE SIGNS LIST

1 Wireless system
10 access point
20 Terminal
30 Server
11,21 CPU
12, 22 ROM
13, 23 RAM
14, 24 Wireless communication module
15 Wired communication module
25 Display
26 Storage
110, 210
Data processing unit
Link management unit
120, 220
121 Aggregation unit
122 Dividing unit
123 Header processing unit
221 Linking unit
222 Deaggregation unit
130, 140, 150, 230, 240, 250 Wireless signal processing unit

The invention claimed is:

1. A transmitting station that is a station that transmits wireless signals, the transmitting station comprising:

a first wireless signal processing circuit configured to transmit wireless signals including first data, using a first channel;

a second wireless signal processing circuit configured to transmit wireless signals including second data, using a second channel that is different from the first channel; and a processor that manages a link state of the first wireless signal processing circuit and a link state of the second wireless signal processing circuit, wherein the processor imparts, in a case in which a multilink is established with a receiving station and wireless signals are to be transmitted using the multilink, first multilink information and identification information to the first data and the second data without dividing each of the first data and the second data, the first multilink information indicating use of the multilink, the identification information indicating an order of the first data and the second data, the first data being data which is input to the processor and to which a first header is imparted, the second data being data which is input to the processor and to which a second header different from the first header is imparted, the first multilink information and the identification information being imparted to each of the first header and the second header, imparts, in a case in which the multilink has not been established with the receiving station or transmission is not to be performed using the multilink, second multilink information to the first header of the first data or the second header of the second data, the second multilink information not indicating the use of the multilink, outputs, in a case in which the first multilink information is imparted, the first data and the second data, to which the first multilink information and the identification information are imparted, to one of the first wireless signal processing circuit and the second wireless signal processing circuit, in an order of input, and outputs, in a case in which the second multilink information is imparted, the first data or the second data, to which the second multilink information is imparted, to one of the first wireless signal processing circuit and the second wireless signal processing circuit, wherein the first and second headers are extended media access control (MAC) headers.

2. A receiving station that is a station that receives wireless signals, the receiving station comprising:

a first wireless signal processing circuit configured to receive wireless signals including non-divided first data, using a first channel, the non-divided first data being data which is input to a transmitting station and to which a first header is imparted;

a second wireless signal processing circuit configured to receive wireless signals including non-divided second data, using a second channel that is different from the first channel, the non-divided second data being data which is input to the transmitting station and to which a second header different from the first header is imparted; and a processor that manages a link state of the first wireless signal processing circuit and a link state of the second wireless signal processing circuit, wherein the processor rearranges the data, in a case in which a multilink is established with the transmitting station and the non-divided first data from the first wireless signal processing circuit and the non-divided second data from the second wireless signal processing circuit have imparted thereto first multilink information and identification information, the non-divided first data and the non-divided second data in accordance with the identification information, the first multilink information indicating use of the multilink, the identification information indicating an order of the first data and the second data, and outputs the data in an order of receipt in a case in which the data has imparted thereto second multilink information not indicating the use of the multilink, wherein the first and second headers are extended media access control (MAC) headers.

3. The receiving station according to claim 2, wherein the processor determines whether or not any of the non-divided first data and the non-divided second data has not been received yet, on the basis of the identification information, and requests, when the non-divided first data or the non-divided second data has not been received yet, the transmitting station for retransmission of the non-divided first data or the non-divided second data that has not been received yet, using one of the first wireless signal processing circuit and the second wireless signal processing circuit.

4. The receiving station according to claim 3, wherein the processor transmits a block ACK to the transmitting station, in accordance with reception states of the non-divided first data and the non-divided second data, using at least one of the first wireless signal processing circuit and the second wireless signal processing circuit.

* * * * *